(12) United States Patent
Xiang et al.

(10) Patent No.: US 11,821,456 B2
(45) Date of Patent: Nov. 21, 2023

(54) CONNECTION ASSEMBLY FOR PREFABRICATED COMPONENTS

(71) Applicant: Guangzhou Metro Design & Research Institute Co., Ltd., Guangdong (CN)

(72) Inventors: Bao Xiang, Guangdong (CN); Feiqi Ou, Guangdong (CN); Xingzhong Nong, Guangdong (CN); Xianli Ding, Guangdong (CN); Juyang Wu, Guangdong (CN); Haiou Shi, Guangdong (CN); Yiheng Ren, Guangdong (CN); Liang Ye, Guangdong (CN); Zihui Zan, Guangdong (CN); Ran Wang, Guangdong (CN); Xiao Li, Guangdong (CN); Chunjie Liu, Guangdong (CN); Hengyi Li, Guangdong (CN); Shengya He, Guangdong (CN); Qian Zhou, Guangdong (CN); He Huang, Guangdong (CN); Wenqi Zhang, Guangdong (CN)

(73) Assignee: Guangzhou Metro Design & Research Institute Co., Ltd., Guangzhou (CN)

( * ) Notice: Subject to any disclaimer, the term of this patent is extended or adjusted under 35 U.S.C. 154(b) by 0 days.

(21) Appl. No.: 17/705,324

(22) Filed: Mar. 26, 2022

(65) Prior Publication Data

US 2022/0213910 A1 Jul. 7, 2022

Related U.S. Application Data

(63) Continuation of application No. PCT/CN2020/138762, filed on Dec. 24, 2020.

(30) Foreign Application Priority Data

Nov. 13, 2020 (CN) .......................... 202011276136.7

(51) Int. Cl.
*F16B 5/06* (2006.01)

(52) U.S. Cl.
CPC .................................. *F16B 5/0607* (2013.01)

(58) Field of Classification Search
CPC .......... E02D 29/16; E04B 1/6158; F16B 2/14; F16B 3/00; F16B 5/002; F16B 5/0025;
(Continued)

(56) References Cited

U.S. PATENT DOCUMENTS 8,147,162 B1 * 4/2012 Burnett ................. F16B 5/0052
403/292

FOREIGN PATENT DOCUMENTS

| CN | 107687213 A | * | 2/2018 | ............. A63C 19/10 |
| CN | 107761765 A | | 3/2018 | |

(Continued)

*Primary Examiner* — Josh Skroupa

(57) ABSTRACT

A connection assembly for prefabricated components provided herein includes two C-shaped groove members and an H-shaped connection member. The C-shaped groove members are each provided with a component connecting part for fixedly connecting with a component, the H-shaped connection member includes a middle web and two side flanges, notches of the C-shaped groove members are in clearance fit with the web, and the side flanges are in stop fit with inverted edges of the C-shaped groove members when the H-shaped connection member is inserted between the C-shaped groove members. The C-shaped groove members and/or the H-shaped connection member are each provided with wedge members, and the wedge members have wedge surfaces for guiding the two C-shaped groove members to be fastened oppositely.

9 Claims, 3 Drawing Sheets

(58) Field of Classification Search
CPC .. F16B 5/0052; F16B 5/0607; F16B 2200/30; Y10T 403/50; Y10T 403/55; Y10T 403/553; Y10T 403/57; Y10T 403/5733; Y10T 403/5793; Y10T 403/7092; Y10T 403/7094
USPC ....... 403/286, 292, 294, 300, 305, 314, 380, 403/381
See application file for complete search history.

(56) References Cited

FOREIGN PATENT DOCUMENTS

| | | | | |
|---|---|---|---|---|
| CN | 108222292 | A | 6/2018 | |
| CN | 209817279 | U | 12/2019 | |
| DE | 1272509 | B * | 7/1968 | ........... E04B 1/6158 |
| DE | 3844548 | A1 * | 10/1989 | |
| DE | 19949694 | A1 * | 4/2001 | ............. A63C 19/10 |

* cited by examiner

CONNECTION ASSEMBLY FOR PREFABRICATED COMPONENTS

CROSS REFERENCE TO RELATED APPLICATIONS

The present application is a Continuation Application of PCT Application No. PCT/CN2020/138762 filed on Dec. 24, 2020, which claims the benefit of Chinese Patent Application No. 202011276136.7 filed on Nov. 13, 2020. All the above are hereby incorporated by reference in their entirety.

TECHNICAL FIELD

The present invention relates to the technical field of component connection, and in particular to a connection assembly for prefabricated components.

BACKGROUND

With the development of the construction technology, an assembly-type construction method is gradually replacing the cast-in-place construction method due to its advantages of rapid and environmental friendly. The prefabricated building components are assembled by using connection members to complete the construction of assembly-type buildings.

The Chinese invention patent application with the publication No. CN107761765A which is published on Mar. 6, 2018 discloses a fully assembled metro station double-column body structure and a construction method thereof, and specifically, a structure part includes a bottom plate block A for hoisting and positioning. Two upper sides of the bottom plate block A are connected to bottom corner plate blocks B. There are side wall blocks C on the bottom corner plate blocks B. Two lower columns Z are fixed to a middle portion of the bottom plate block A. A left side middle plate block D is fixed to a left side wall block C and a left side lower column Z. A right side middle plate block D is fixed to a right side wall block C and a right side lower column Z. The left side middle plate block D and the right side middle plate block D are each provided with an upper column Z. The upper column Z is provided with a top plate block F. Top corner blocks E are fixed to two sides of the top plate block F and an end of the side wall block C. Connections between the bottom plate block A and the bottom corner plate blocks B, between the bottom corner plate blocks B and the side wall blocks C, between the side wall blocks C and the top corner plate blocks E, between the top corner plate blocks E and the top plate block F, and between the butted middle plate blocks D are achieved through mortise and tenon joints and bolts.

By using the fully assembled metro station double-column body structure in the prior art, the construction of the entire metro station can be realized through assembly and connection of different components. However, because the connection portions of the components usually bear relatively large shearing force and bending moment, bolted connection cannot meet the requirements of high-strength connection. Further, the operation of screwing bolts is cumbersome and the construction efficiency is low.

SUMMARY

In order to solve the above problems, the objective of the present invention is to provide a connection assembly for prefabricated components, so as to solve the problems that bolted connection cannot meet the requirements of high-strength connection, and the operation of screwing bolts is cumbersome and the construction efficiency is low.

The technical solution of a connection assembly for prefabricated components of the present invention is as follows.

A connection assembly for prefabricated components includes two C-shaped groove members and an H-shaped connection member. The C-shaped groove members are each provided with a component connecting part for fixedly connecting with a component, the H-shaped connection member comprises a middle web and two side flanges, notches of the C-shaped groove members are in clearance fit with the web, and the side flanges are in stop fit with inverted edges of the C-shaped groove members when the H-shaped connection member is inserted between the C-shaped groove members.

The C-shaped groove members and/or the H-shaped connection member are each provided with wedge members, and the wedge members have wedge surfaces for guiding the two C-shaped groove members to be fastened oppositely.

Further, opposite sides of the two side flanges should be each provided with a first wedge member, and a wedge surface of the first wedge member should be arranged obliquely in a length direction of the H-shaped connection member; and inner side walls of the inverted edges of the C-shaped groove members should be each provided with a second wedge member, and a wedge surface of the second wedge member should be arranged obliquely in a length direction of the C-shaped groove members.

Further, the first wedge members should be arranged on a middle portion in the length direction of the H-shaped connection member, and the first wedge members on the two side flanges are symmetrically arranged.

Further, an included angle between the wedge surfaces of the first wedge members and the length direction of the H-shaped connection member should be equal to an included angle between the wedge surfaces of the second wedge members and the length direction of the C-shaped groove members.

Further, slopes of the wedge surfaces of the first wedge members relative to the length direction of the H-shaped connection member should be not more than one-fifth.

Further, slopes of the wedge surfaces of the first wedge members relative to the length direction of the H-shaped connection member should be one-twentieth.

Further, high-strength cement slurry should be poured between the C-shaped groove members and the H-shaped connection member.

Further, raised ribs should be further arranged on an outer wall of the H-shaped connection member, and the raised ribs should be arranged at intervals in a length direction of the H-shaped connection member.

Further, the component connecting part comprises anchoring elements arranged on outer walls of the C-shaped groove members and connection ribs for connecting with main ribs of the components.

Further, inner walls of the C-shaped groove members should be each provided with a positioning groove, and the positioning grooves are formed at ends of the C-shaped groove members.

Beneficial effects: during construction, after the two components are butted in place, the H-shaped connection member is inserted between two C-shaped groove members, and the web of the H-shaped connection member enters notches of the C-shaped groove members. The two side flanges of the H-shaped connection member are in stop fit with the inverted edges of the C-shaped groove members, and the H-shaped connection member exerts opposite fastening forces on the two adjacent components. It is precisely because of the design of the wedge members that, as the H-shaped connection member gradually travels between the two C-shaped groove members, the wedge surfaces of the wedge members convert longitudinal movement into the opposite fastening forces on the two C-shaped groove members, so that the two components are fastened together.

The connection assembly replaces the existing bolt connector. Since the web of the H-shaped connection member is in a longitudinal continuous structure and the H-shaped connection member is of high strength, a high-strength fastening connection between the two adjacent components can be ensured. The integrated H-shaped connection member replaces multiple bolt members, which can exert a stronger and more reliable fastening force on the two adjacent components, and meet the requirements of high-strength connection. Moreover, compared to the operation of bolt screwing, the operation is simplified, and the construction efficiency is improved.

In addition, the cured high-strength cement slurry has good great pressure resistance. The high-strength cement slurry is used to fill the gap, and more importantly, the cured high-strength cement slurry can effectively prevent the H-shaped connection member from retreating, and bear an extrusion force generated by the C-shaped groove members together with the H-shaped connection member, ensuring that the H-shaped connection member can reliably connect the two components.

Figure 1:
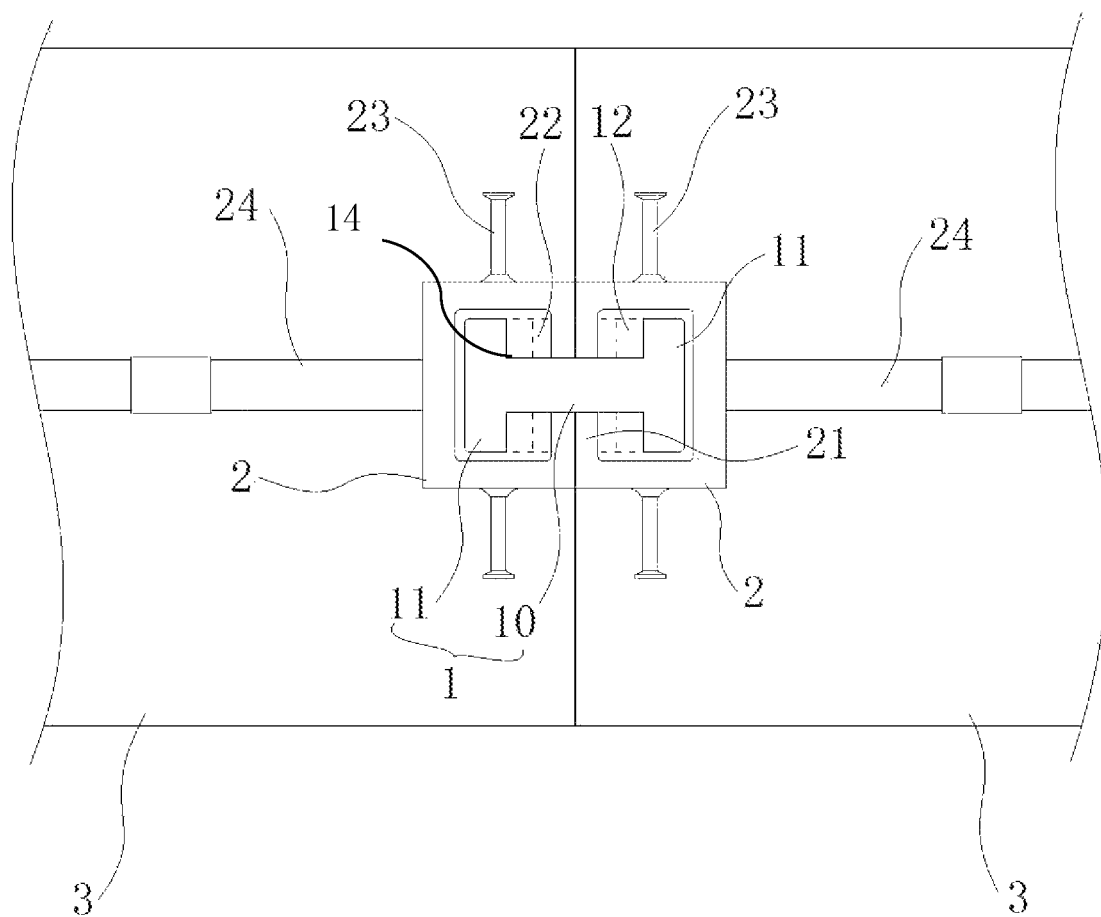
FIG. 1 is a schematic structure diagram of a connection assembly in a specific embodiment 1 of a connection assembly for prefabricated components according to the present invention when used in components.

In the drawings: 1—H-shaped connection member, 10—web, 11—side flange, 12—first wedge member, 120—wedge surface of first wedge member, 13—raised rib, 14—notch, 2—C-shaped groove member, 21—inverted edge, 22—second wedge member, 220—wedge surface of second wedge member, 23—anchoring element, 24—connection rib, 25—positioning groove, 3—component, and 4—high-strength cement slurry.

DETAILED DESCRIPTION

The specific implementations of the present invention are described in more detail below with reference to the accompanying drawings and embodiments. The following embodiments are illustrative of the present invention and should not be construed as limiting of the scope of the present invention.

Figure 2:
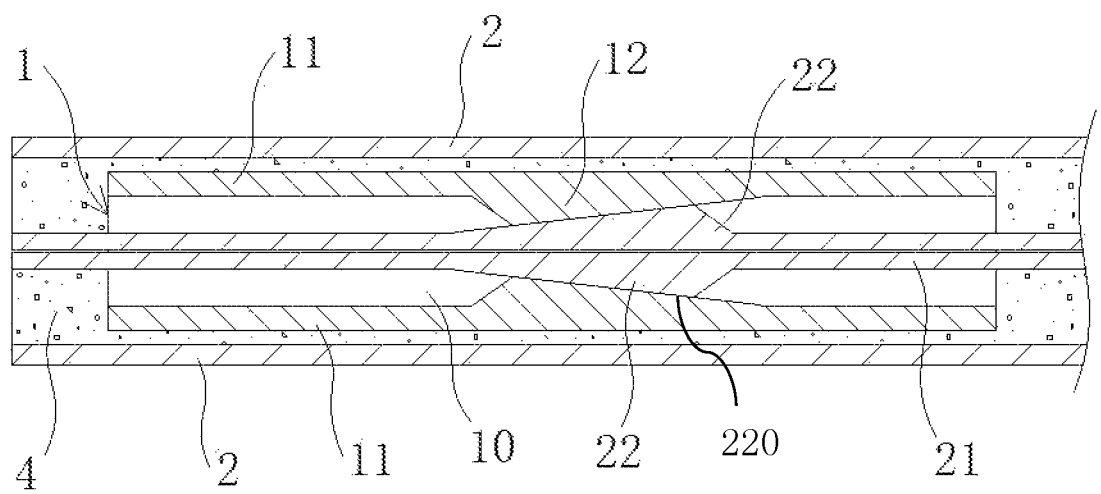
FIG. 2 is a longitudinal sectional view of the connection assembly in a finished state in the specific embodiment 1 of the connection assembly for prefabricated components according to the present invention.
Figure 3:
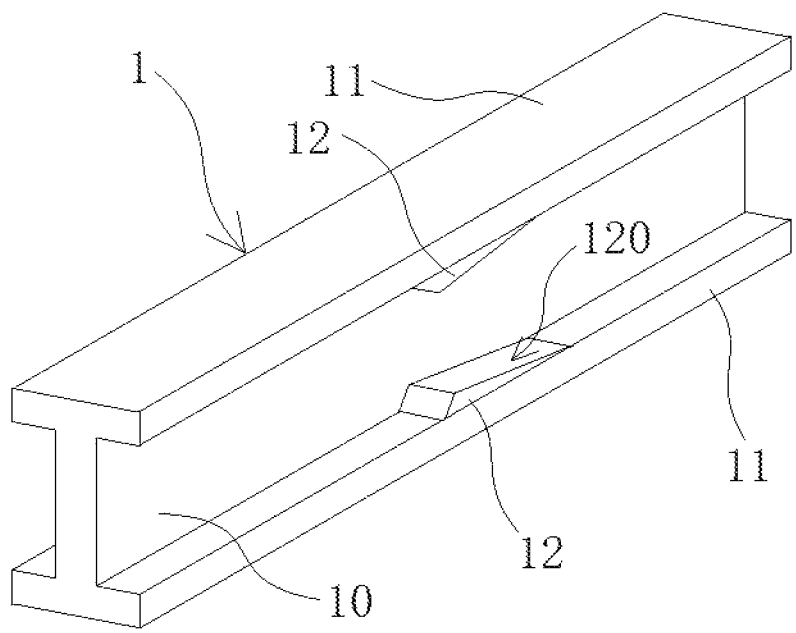
FIG. 3 is a three-dimensional schematic diagram of an H-shaped connection member in FIG. 1.

In a specific embodiment 1 of a connection assembly for prefabricated components of the present invention, as shown in FIG. 1 to FIG. 3, the connection assembly for prefabricated components includes two C-shaped groove members 2 and an H-shaped connection member 1. The C-shaped groove members 2 are each provided with a component connecting part for fixedly connecting with a component 3, the H-shaped connection member 1 includes a middle web 10 and two side flanges 11, notches 14 of the C-shaped groove members 2 are in clearance fit with the web 10, and the side flanges 11 are in stop fit with inverted edges 21 of the C-shaped groove members 2 when the H-shaped connection member 1 is inserted between the C-shaped groove members 2. The C-shaped groove members 2 and/or the H-shaped connection member 1 are each provided with a wedge member, and the wedge members have wedge surfaces for guiding the two C-shaped groove members 2 to fasten oppositely.

During construction, after the two components 3 are butted in place, the H-shaped connection member 1 is inserted between the C-shaped groove members 2 in the two components 3, and the web 10 of the H-shaped connection member 1 enters notches 14 of the C-shaped groove members 2. The two side flanges 11 of the H-shaped connection member 1 are in stop fit with the inverted edges 21 of the C-shaped groove members 20, and the H-shaped connection member 1 exerts opposite fastening forces on the two adjacent components. It is because of the design of the wedge members that, as the H-shaped connection member 1 gradually travels between the two C-shaped groove members 2, the wedge surfaces of the wedge members convert longitudinal movement into the opposite fastening forces on the two C-shaped groove members 2, so that the two components 3 are fastened together.

The connection assembly replaces the existing bolt connector. Since the web 10 of the H-shaped connection member 1 is in a longitudinal continuous structure and the H-shaped connection member 1 is of high strength, a high-strength fastening connection between the two adjacent components 3 can be ensured. The integrated H-shaped connection member 1 replaces multiple bolt members, which can exert a stronger and more reliable fastening force on the two adjacent components 3, and meet the requirement of high-strength connection. Moreover, compared to the operation of screwing bolts, the operation is simplified, and the construction efficiency is improved.

In the present embodiment, opposite sides of the two side flanges 11 of the H-shaped connection member 1 are each provided with a first wedge member 12, and a wedge surface 120 of the first wedge member is arranged obliquely in a length direction of the H-shaped connection member 1. Inner side walls of the inverted edges 21 of the C-shaped groove members 2 are each provided with a second wedge member 22, and a wedge surface 220 of the second wedge member is arranged obliquely in a length direction of the C-shaped groove members 2. Specifically, the first wedge members 12 on the two side flanges 11 of the H-shaped connection member 1 are symmetrically arranged, that is, the two first wedge members 12 are symmetrically arranged with respect to a longitudinal centerline of the H-shaped connection member 1. An inner taper opening is formed through the wedge surfaces 120 of the two first wedge members to exert a transverse extrusion force on the two C-shaped groove members 2.

The first wedge members 12 are arranged on a middle portion in the length direction of the H-shaped connection member 1, and an included angle between the wedge surfaces 120 of the first wedge members and the length direction of the H-shaped connection member 1 are equal to an included angle between the wedge surfaces 220 of the second wedge members and the length direction of the C-shaped groove member 2. In order to ensure that the longitudinal movement is effectively converted into the transverse extrusion force, slopes of the wedge surfaces 120 of the first wedge members relative to the length direction of the H-shaped connection member 1 are not more than one-fifth, and specifically, slopes of the wedge surfaces 120 of the first wedge members relative to the length direction of the H-shaped connection member 1 are one-twentieth. Such slopes can not only ensure the opposite fastening forces generated by the H-shaped connection member 1 and the two C-shaped groove members 2, but also ensure that the longitudinal movement of the H-shaped connection member 1 can be converted into the transverse extrusion force with sufficient strength.

When the H-shaped connection member 1 moves longitudinally to fully compress the two components 3, high-strength cement slurry 4 is poured into the gap between the two C-shaped groove members 2 and the H-shaped connection member 1. The cured high-strength cement slurry 4 has great pressure resistance. The high-strength cement slurry 4 is used to fill the gap, and more importantly, the cured high-strength cement slurry 4 can effectively prevent the H-shaped connection member 1 from retreating, and bear the extrusion force generated by the C-shaped groove members 2 together with the H-shaped connection member 1, ensuring that the H-shaped connection member 1 can reliably connect the two components 3.

In the present embodiment, the components 3 are reinforced concrete components. The C-shaped groove members 2 are pre-embedded on connection surfaces of the components 3 with the notches outward. The component connecting part of the C-shaped groove member 2 includes anchoring elements 23 arranged on the outer wall of the C-shaped groove member 2 and a connection rib 24 for connecting with the main rib of a component. Specifically, the anchoring elements 23 are anchoring studs fixedly connected to the C-shaped groove member 2, and the connection rib 24 is fixedly connected to a groove wall of the C-shaped groove member 2 facing away from the notches. The connection rib 24 is connected to the main rib of the component by a bolt sleeve. The C-shaped groove members 2 and the components 3 are formed into an integral structure by using the anchoring elements 23 and the connection ribs 24. Moreover, positioning grooves 25 are formed on inner walls of the C-shaped groove members 2, and the positioning grooves 25 are formed at ends of the C-shaped groove members 2. The positioning grooves 25 can be used to receive a jack fitted therein, so as to form a longitudinal driving force on the H-shaped connection member 1.

Figure 4:
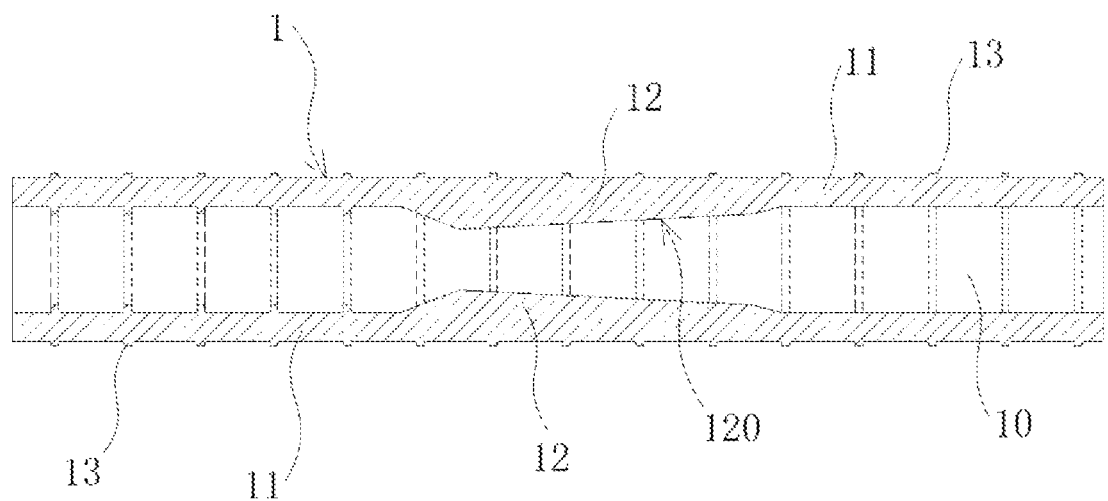
FIG. 4 is a longitudinal sectional view of an H-shaped connection member in a specific embodiment 2 of a connection assembly for prefabricated components according to the present invention.
Figure 5:
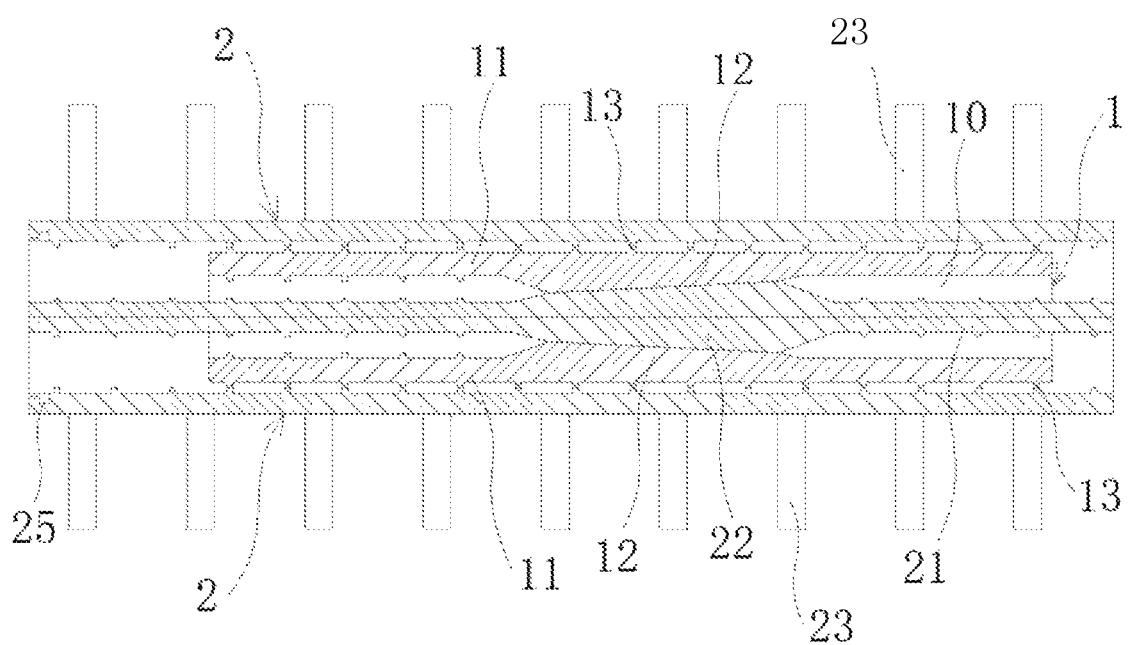
FIG. 5 is a longitudinal sectional view of a connection assembly in the specific embodiment 2 of the connection assembly for prefabricated components according to the present invention when assembled in place.

In a specific embodiment 2 of a connection assembly for prefabricated components according to the present invention, in order to meet different use requirements, the connection assembly for prefabricated components of the specific embodiment 1 can be further modified, for example: raised ribs 13 are further arranged on the outer side wall of the H-shaped connection member 1, as shown in FIG. 4 and FIG. 5, the raised ribs 13 are arranged around the periphery of the H-shaped connection member 1, and the raised ribs 13 are arranged at intervals in the length direction of the H-shaped connection member 1. The bonding strength between the H-shaped connection member 1 and the high-strength cement slurry is improved by the raised ribs 13, and the fastening connection effect of the connection assembly is ensured.

In other specific embodiments of the connection assembly for prefabricated components according to the present invention, in order to meet different use requirements, the components are not limited to the reinforced concrete components in the specific embodiment 1, but may also be steel components. The steel components are in welded connection with outer side walls of the C-shaped groove members, and the welded parts of the outer side walls of the C-shaped groove members constitute the component connecting parts.

In other specific embodiments of the connection assembly for prefabricated components according to the present invention, in order to meet different use requirements, the wedge members can be arranged only on the H-shaped connection member or the C-shaped groove members, and the wedge surfaces of the wedge members and the C-shaped groove members cooperate to generate opposite fastening forces on the two C-shaped groove members, and alternatively, the wedge surfaces of the wedge members and the H-shaped connection member cooperate to generate the opposite fastening forces on the two C-shaped groove members. In addition, the slopes of the wedge surfaces of the wedge members relative to the length direction of the H-shaped connection member are not limited to one-twentieth in the specific embodiment 1, but may also be one-tenth, one-fifth, or any value less than one-fifth.

The foregoing descriptions are only preferred implementations of the present invention. It should be noted that several improvements and replacements may further be made by a person of ordinary skill in the art without departing from the principle of the present invention, and such improvements and replacements should also be deemed as falling within the protection scope of the present invention.

The invention claimed is:

1. A connection assembly for prefabricated components, comprising two C-shaped groove members and an H-shaped connection member, wherein the C-shaped groove members are each provided with a component connecting part for fixedly connecting with a component, the H-shaped connection member comprises a middle web and two side flanges, notches of the C-shaped groove members are in clearance fit with the web, and the side flanges are in stop fit with inverted edges of the C-shaped groove members when the H-shaped connection member is inserted between the C-shaped groove members; wherein opposite sides of the two side flanges are each provided with a first wedge member, and a wedge surface of the first wedge member is arranged obliquely in a length direction of the H-shaped connection member; and inner side walls of the inverted edges of the C-shaped groove members are each provided with a second wedge member, and a wedge surface of the second wedge member is arranged obliquely in a length direction of the C-shaped groove members, the wedge surface of the first wedge member and the wedge surface of the second wedge member guide the two C-shaped groove members to be fastened oppositely.

2. The connection assembly for prefabricated components according to claim 1, wherein the first wedge members are arranged on a middle portion in the length direction of the H-shaped connection member, and the first wedge members on the two side flanges are symmetrically arranged.

3. The connection assembly for prefabricated components according to claim 1, wherein an included angle between the wedge surfaces of the first wedge members and the length direction of the H-shaped connection member are equal to an included angle between the wedge surfaces of the second wedge members and the length direction of the C-shaped groove members.

4. The connection assembly for prefabricated components according to claim 1, wherein slopes of the wedge surfaces of the first wedge members relative to the length direction of the H-shaped connection member are not more than one-fifth.

5. The connection assembly for prefabricated components according to claim 1, wherein slopes of the wedge surfaces of the first wedge members relative to the length direction of the H-shaped connection member are one-twentieth.

6. The connection assembly for prefabricated components according to claim 1, wherein cement slurry is poured between the C-shaped groove members and the H-shaped connection member.

7. The connection assembly for prefabricated components according to claim 1, wherein raised ribs are further arranged on an outer wall of the H-shaped connection member, and the raised ribs are arranged at intervals in a length direction of the H-shaped connection member.

8. The connection assembly for prefabricated components according to claim 1, wherein the component connecting part comprises anchoring elements arranged on outer walls of the C-shaped groove members and connection ribs for connecting with main ribs of the components.

9. The connection assembly for prefabricated components according to claim 1, wherein inner walls of the C-shaped groove members are each provided with a positioning groove, and the positioning grooves are formed at ends of the C-shaped groove members.

* * * * *